(12) United States Patent
Lee

(10) Patent No.: US 7,661,950 B2
(45) Date of Patent: Feb. 16, 2010

(54) DEVICE FOR SEPARATING MOLDS

(75) Inventor: Han-Lung Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/327,569

(22) Filed: Dec. 3, 2008

(65) Prior Publication Data
US 2009/0285928 A1  Nov. 19, 2009

(30) Foreign Application Priority Data
May 16, 2008  (CN) .................. 2008 1 0301616

(51) Int. Cl.
*B29C 33/20* (2006.01)
*B29C 33/40* (2006.01)

(52) U.S. Cl. .......... 425/451.7; 249/66.1; 425/441; 425/444; 425/450.1; 425/472

(58) Field of Classification Search .......... 425/139, 425/441, 444, 450.1, 451, 451.7, 472, 808; 249/66.1; 264/334
See application file for complete search history.

(56) References Cited

U.S. PATENT DOCUMENTS

| | | | | |
|---|---|---|---|---|
| 2,365,764 A | * | 12/1944 | Kastner | 264/334 |
| 2,980,951 A | * | 4/1961 | Brown | 425/408 |
| 4,376,750 A | * | 3/1983 | Briem et al. | 264/336 |
| 5,219,595 A | * | 6/1993 | Caggiani | 425/589 |
| 5,693,268 A | * | 12/1997 | Widman et al. | 264/1.1 |
| 5,935,492 A | * | 8/1999 | Martin et al. | 264/1.37 |
| 7,186,103 B2 | * | 3/2007 | Menard | 425/28.1 |
| 7,462,320 B2 | * | 12/2008 | Ho et al. | 264/334 |
| 2003/0106983 A1 | * | 6/2003 | Garigiulo | 249/66.1 |
| 2006/0202367 A1 | * | 9/2006 | Knutzen et al. | 264/1.32 |
| 2007/0052117 A1 | * | 3/2007 | Arnet et al. | 264/1.1 |

* cited by examiner

*Primary Examiner*—Yogendra Gupta
*Assistant Examiner*—Emmanuel S Luk
(74) *Attorney, Agent, or Firm*—Clifford O. Chi

(57) ABSTRACT

A mold separating device includes a base with a driven member and a driving member rotating on the base. The driven member has a first through hole in it, and the base has a second through hole in it. The through holes receive a first mold and a second mold. The first through hole is coaxial to the second through hole. A cavity is defined in an inner wall of the driven member. An ejector is elastically fixed in the cavity and can be expelled from the cavity. A separator is disposed on a front portion of the ejector. A rotatable shaft is fixed in the driving member.

8 Claims, 4 Drawing Sheets

DEVICE FOR SEPARATING MOLDS

BACKGROUND

1. Field of the Invention

The disclosure relates to a separating device for separating, for example two combined molds from each other.

2. Description of Related Art

Traditionally, nano imprinting includes formation of a relief pattern in a layer of a first mold and transferring a pattern corresponding to the relief pattern into an underlying substrate of a second mold. The first mold may be pressed on the second mold to obtain a desired position to facilitate patterning thereof. A vacuum is generated between the first and second molds during the nano imprint process, which must be overcome to separate the first and second molds. A conventional technique for separating the first and second molds is to utilize a cutter. However, the cutter is usually employed at a single point so the first and second molds are not uniformly separated, affecting effectiveness of separation.

Therefore, a mold separating device is desired to overcome the limitations described.

BRIEF DESCRIPTION OF THE DRAWINGS

Many aspects of the present mold separation device can be better understood with reference to the following drawings. The components in the drawings are not necessarily drawn to scale, the emphasis instead being placed upon clearly illustrating the principles of the present mold separating device. Moreover, in the drawings, like reference numerals designate corresponding parts throughout the several views.

DETAILED DESCRIPTION OF THE EMBODIMENTS

Reference will now be made to the drawings to describe embodiments of the present mold separating device.

Figure 1:
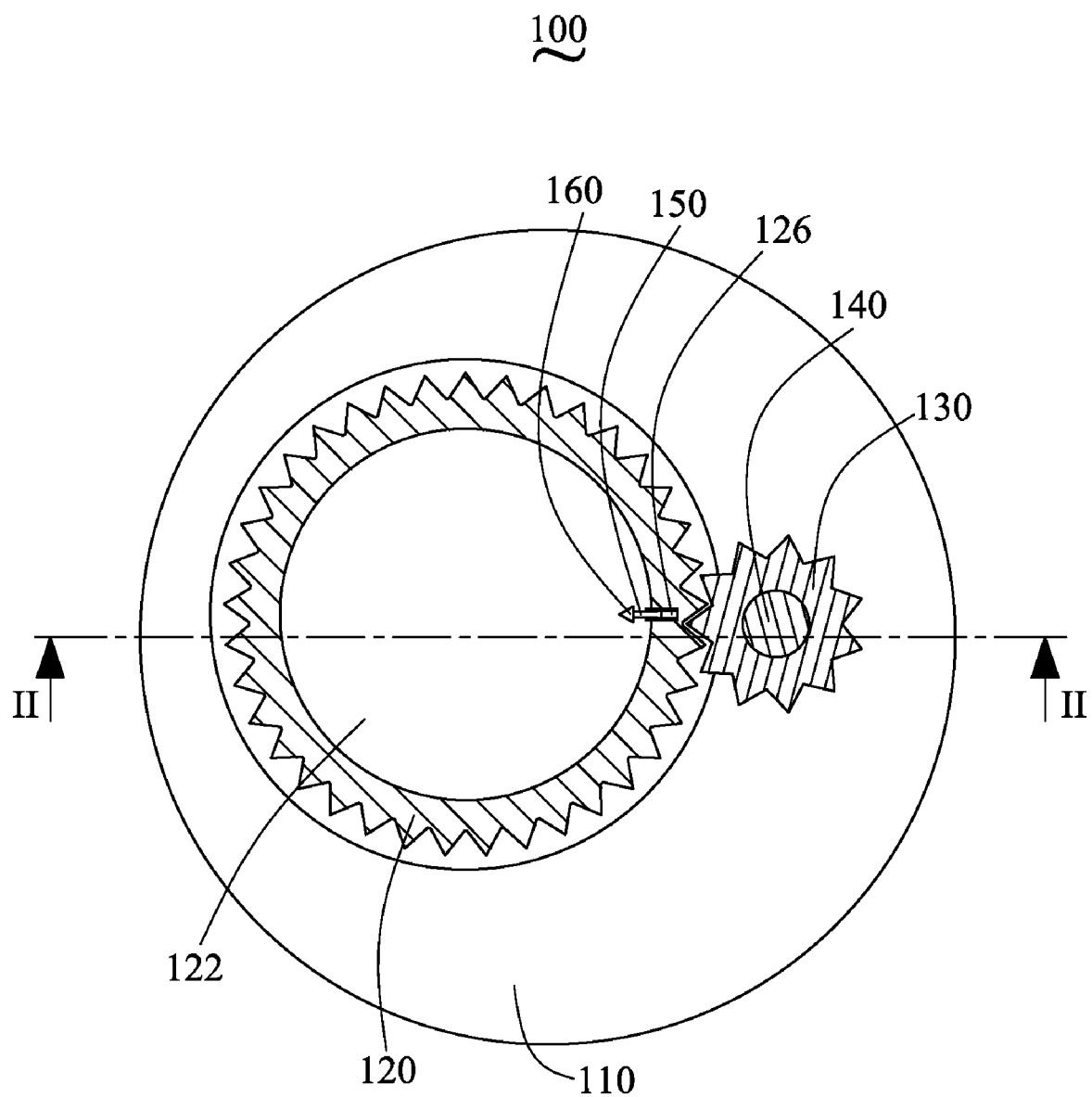
FIG. 1 is a schematic view of a mold separating device according to a first embodiment.
Figure 2:
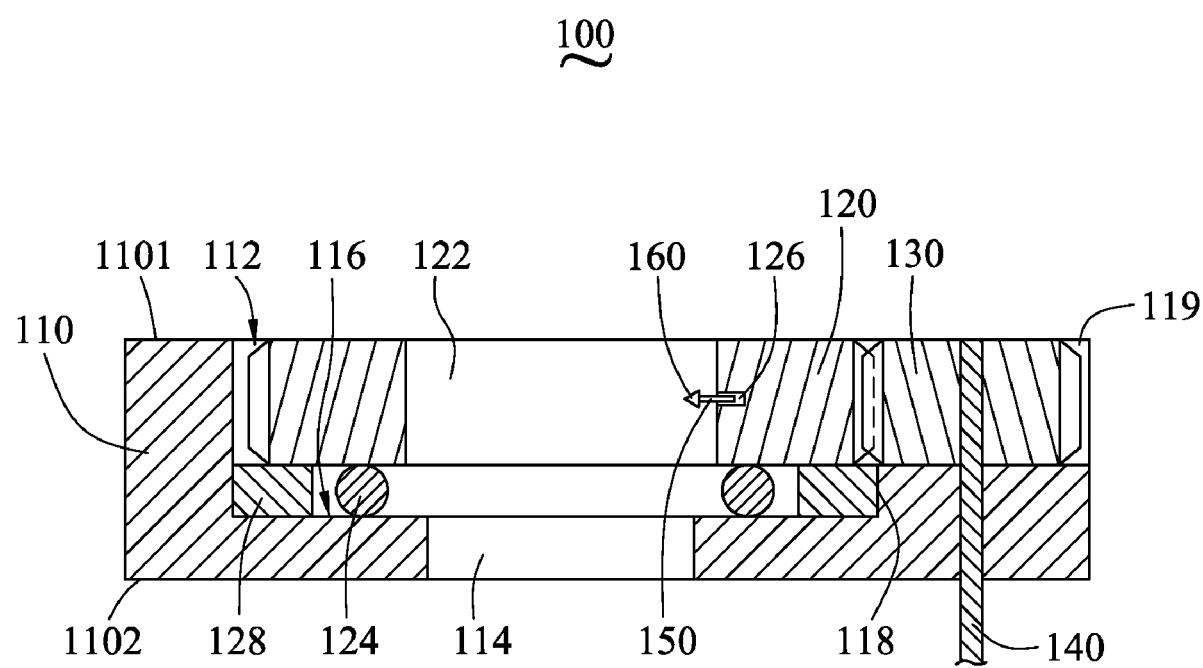
FIG. 2 is a cross section of the mold separating device of FIG. 1, taken along line II-II thereof.

Referring to FIGS. 1 and 2, a mold separating device 100 includes a base 110, a driven member 120, a driving member 130, a rotatable shaft 140, an ejector 150, and a separator 160.

The base 110 includes a first surface 1101 and an opposite second surface 1102. An opening extending between the first surface 1101 and the second surface 1102. The opening has a circular recess 112 defined approximately midway on the base 110 and a second through hole 114 defined in the bottom of the circular recess 112. The second through hole 114 is circular and coaxial to the circular recess 112. The radius of the second through hole 114 is less than the radius of the circular recess 112. A step 116 is formed between the second through hole 114 and the circular recess 112. The diameter of the second through hole 114 exceeds or equals the radial diameter of a first mold (not shown) and a second mold (not shown). Therefore, the first and second molds can be disposed in the mold separating device 100. A junction is defined between the first and second molds. The base 110 defines a receiving cavity 119 receiving a driving member therein. The receiving cavity 119 communicates with the circular recess 112.

The driven member 120 is rotatably disposed in the receiving cavity 119. A first through hole 122 is defined in the center of the driven member 120. A cavity 126 is defined in an inner wall of the driven member 120. A annular protrusion 128 is fixed on the bottom of the driven member 120. The outer side of the annular protrusion 128 abuts a sidewall 118 of the base 110. The lower side of the annular protrusion 128 abuts the step 116. The annular protrusion 128 is configured to rotate the driven member 120 along a specific track. A ball 124 is disposed between the step 116 and the driven member 120. The ball 124 is configured to reduce friction between the step 116 and the driven member 120.

The driving member 130 is rotatably disposed in the receiving cavity 119. The driving member 130 coupled to the driven member 120 for driving the driven member to rotate. The driving member 130 and the driven member 120 may be two gears meshed with each other.

One end of the rotatable shaft 140 is fixed in the driving member 130. Another end of the rotatable shaft 140 is connected with a driving source (not shown) such as a motor for rotating the rotatable shaft 140 and the driving member 130 and the driven member 120, in sequence.

The ejector 150 is elastically fixed in the cavity 126 and can be impelled outwardly therefrom. The ejector 150 is driven by a hydraulic driving device such as a motor, controlled by a programmable logic controller (PLC).

The separator 160 is fixed to the front end of the ejector 150, and moves along a radial axis of the driven member 120.

When the first and second molds are to be separated, both are placed in the mold separating device 100 in a position whereby the junction aligns with the separator 160. Controlled by the PLC, the motor drives the ejector 150 to impel the separator 160 into the junction to slightly separate the first and second molds. The driving source rotates the rotatable shaft 140 and, in turn, the driving member 130 and driven member 120 in sequence. Rotation of the driven member 120 moves the separator 160 along a circular edge of the junction, introducing air thereinto. Introduced air accordingly overcomes the vacuum-attraction, and the first and second molds can then be separated by the mold separating device 100.

Figure 3:
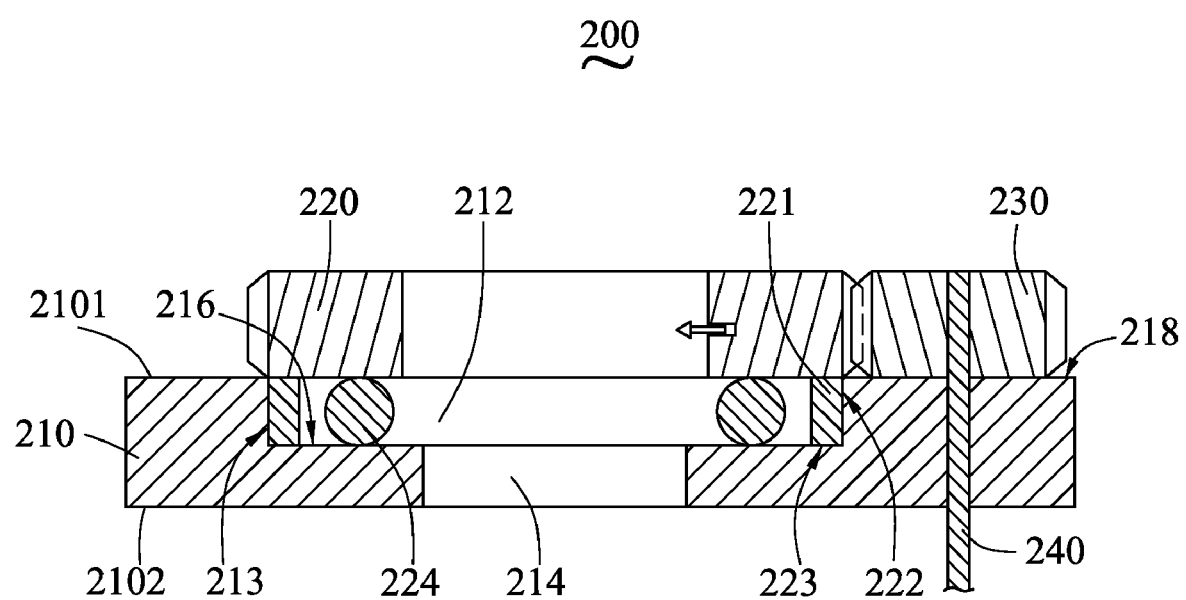
FIG. 3 is a cross section of a mold separating device according to a second embodiment.

FIG. 3 is a cross section of a mold separating device 200 according to a second embodiment, differing from mold separating device 100 only in that a driving member 230 is rotatably disposed on an upper surface 218 of the base 210. The base 210 includes a first surface 2101 and an opposite second surface 2102. An opening extending between the first surface 2101 and the second surface 2102. The opening has a circular recess 212 defined approximately midway on the base 210 and a second through hole 214 defined in the bottom of the circular recess 212. The second through hole 214 is circular and coaxial to the circular recess 212. The radius of the second through hole 214 is less than the radius of the circular recess 212. A step 216 is formed between the second through hole 214 and the circular recess 212. The diameter of the second through hole 214 exceeds or equals the radial diameter of a first mold (not shown) and a second mold (not shown). Thus, the first and second molds can be disposed in the mold separating device 200. A annular protrusion 221 is fixed on the bottom of a driven member 220. An outer side 222 of the annular protrusion 221 abuts a sidewall 213 of the base 210. A lower side 223 of the annular protrusion 221 abuts the step 216. The annular protrusion 221 is configured to rotate the driven member 220 along the specific track. One end of a rotatable shaft 240 is fixed in the driving member 230.

Another end of the rotatable shaft 240 is connected with a driving source (not shown) for rotation thereby. The driving member 230 coupled to the driven member 220 for driving the driven member to rotate. The driving member 230 and the driven member 220 may be two gears meshed with each other. A ball 224 is disposed between the step 216 and the annular protrusion 221, configured to reduce friction therebetween.

Figure 4:
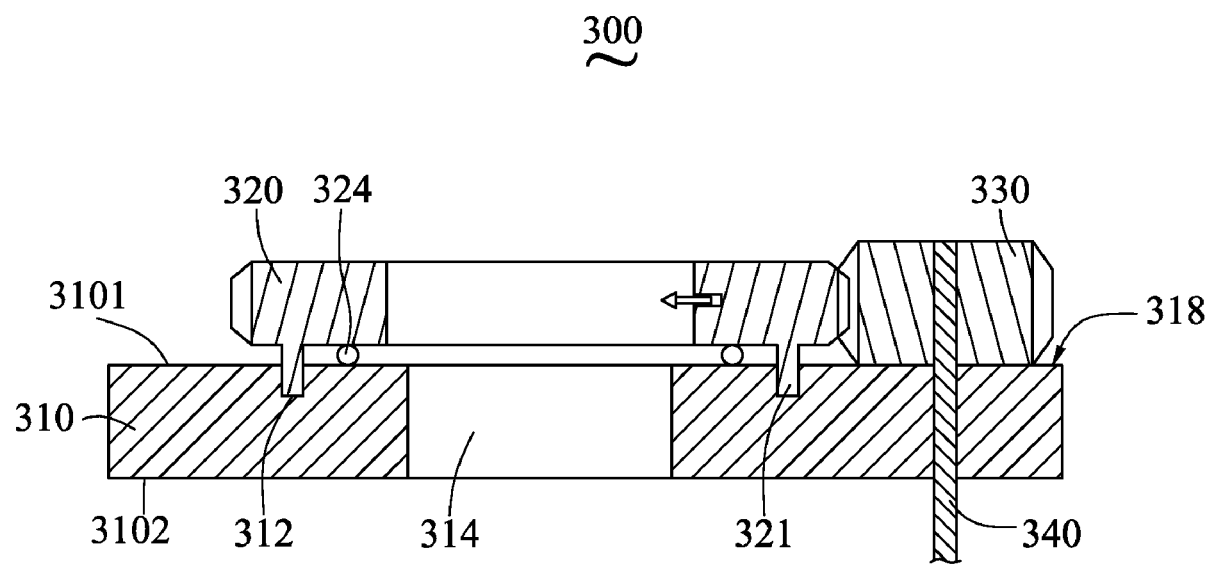
FIG. 4 is a cross section of a mold separating device according to a third embodiment.

FIG. 4 is a cross section of a mold separating device 300 according to a third embodiment, differing from mold separating device 100 only in that a driving member 330 is rotatably disposed on an upper surface 318 of a base 310. The base 310 includes a first surface 3101 and an opposite second surface 3102. A second through hole 314 is defined approximately midway position on the base 310. The diameter of the second through hole 314 exceeds or equals the radial diameter of a first mold (not shown) and a second mold (not shown). The first and second molds can be disposed in the mold separating device 200. An annular groove 312 is defined on the base 310. A annular protrusion 321 is fixed on the bottom of a driven member 320. The annular protrusion 321 engages the annular groove 312, rotating driven member 220 along the specific track. A driving member 330 is rotatably disposed on an upper surface 318 of the base 310. One end of a rotatable shaft 340 is fixed in the driving member 330. Another end of the rotatable shaft 340 is connected with a driving source (not shown) rotating the rotatable shaft 340. The driving member 330 coupled to the driven member 320 for driving the driven member to rotate. The driving member 330 and the driven member 320 may be two gears meshed with each other. A ball 324 is disposed between the upper surface 318 and the driven member 320. The ball 324 is configured to reduce friction between the base 310 and the driven member 320.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A separating device for separating a first mold from a second mold, comprising:

a base;
a driven member rotatably disposed on the base, the driven member defining a first through hole for accommodating a combined first mold and second mold therein;
a driving member rotatably disposed on the base and coupled to the driven member for driving the driven member to rotate;
a motor coupled to the driving member and a separator coupled to the driven member in the first through hole for insertion between the first mold and the second mold and moving around the first mold and the second mold.

2. The separating device of claim 1, wherein the base includes a first surface, an opposite second surface, an opening extending between the first and second surfaces, and a step in the opening, the driven member received in the opening between the first and second surfaces.

3. The separating device of claim 1, wherein the base includes a first surface, an opposite second surface, an opening extending between the first and second surfaces, and a step in the opening, the driven member including a annular protrusion received in the opening and resting on the step.

4. The separating device of claim 1, wherein the base includes a first surface, an opposite second surface, and an annular groove defined in the first surface, the driven member comprising a annular protrusion engaged in the annular groove.

5. The separating device of claim 1, further comprising an ejector wherein the driven member includes a cavity, the ejector mounted in the cavity with the separator coupled thereto, the ejector being movable relative to the cavity and configured for moving the separator away from the inner way and toward the first mold and the second mold.

6. The separating device of claim 5, further comprising a programmable logic controller for controlling movement of the ejector.

7. The separating device of claim 1, further comprising a ball disposed between the base and the driven member.

8. The separating device of claim 1, wherein the driven member and the driving member are two gears meshed with each other.

* * * * *